United States Patent Office 3,704,297
Patented Nov. 28, 1972

3,704,297
7 - (1,4 - CYCLOHEXADIENYLACYLAMIDO)CEPH-
ALOSPORANIC ACIDS AND RELATED COM-
POUNDS
William Dvonch, Radnor, and Harvey E. Alburn, West
Chester, Pa., assignors to American Home Products
Corporation, New York, N.Y.
No Drawing. Continuation-in-part of application Ser. No.
23,099, Apr. 6, 1970, which is a continuation-in-part of
application Ser. No. 843,801, July 22, 1969, both now
abandoned. This application Mar. 5, 1971, Ser. No.
121,592
Int. Cl. C07d 99/24
U.S. Cl. 260—243 C           5 Claims

ABSTRACT OF THE DISCLOSURE

This invention concerns 7-(1,4-cyclohexadienylacyl-
amido)cephalosporanic acids, related compounds and the
salts thereof which have potent antibiotic activity particu-
larly against penicillin resistant staphylococci.

---

This application is a continuation-in-part of Ser. No.
23,099 filed Apr. 6, 1970, which is a continuation-in-part
of Ser. No. 843,801 filed July 22, 1969, both now aban-
doned.

The present invention relates to new and novel synthetic
cephalosporin type compounds. In particular, this inven-
tion relates to 7-(1,4-cyclohexadienylacylamido)cephalo-
sporanic acids, related compounds and the salts thereof
which in standard and accepted biological procedures have
demonstrated activity against penicillin resistant staphy-
lococci.

The new and novel compounds of the present invention
are exemplified by the following structural formula:

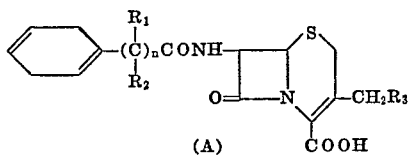

(A)

wherein $R_1$ and $R_2$ are both selected from the group con-
sisting of hydrogen and lower alkyl; $R_3$ is selected from the
group consisting of hydrogen, hydroxy, (lower)alkanoyl-
oxy or N-pyridinium; $n$ is an integer from 1 to about 6; and
the non-toxic biologically active salts thereof. As employed
herein the terms "lower alkyl," "lower alkoxy" and the
like are meant to include both straight and branched
chain hydrocarbon moieties containing from one to about
six carbon atoms. The compounds of the present invention
are designated as "7-(1-,4-cyclohexadienylacylamido)-8-
oxo-3- substituted-5-thia-1-azabicyclo[4.2.0]oct-2-ene - 2-
carboxylic acids." When the 3-position of the compounds
of this invention is substituted with an "acetoxymethyl"
(—$CH_2OCOCH_3$) group, the compounds are also named
as "7 - (1,4 - cyclohexadienylacylamido)cephalosporanic
acids." Typical examples of these compounds are:

7-[2-(1,4-cyclohexadien-1-yl)acetamido]-3-(hydroxy-
methyl)-8-oxo-5-thia-1-azabicyclo[4.2.0]oct-2-ene-
2-carboxylic acid acetate, also, designated 7-[2-(1,4-cyclohexadien-1-yl)acetamido]cephalosporanic
acid;

7-[2-(1,4-cyclohexadien-1-yl)propionamido]-3-(hydroxy-
methyl)-8-oxo-5-thia-1-azabicyclo[4.2.0]oct-2-ene-
2-carboxylic acid acetate, also called 7-[2-(1,4-cyclohexadien-1-yl)propionamido]cephalo-
sporanic acid;

7-[3-(1,4-cyclohexadien-1-yl)butyramido]-3-(hydroxy-
methyl)-8-oxo-5-thia-1-azabicyclo[4.2.0]oct-2-ene-
2-carboxylic acid acetate, also named 7-[3-(1,4-cyclohexadien-1-yl)butyramido]cephalo-
sporanic acid; and 7-[2-(1,4-cyclohexadien-1-yl)acetamido]-3-(hydroxy-
methyl)-8-oxo-5-thia-1-azabicyclo[4.2.0]oct-ene-
2-carboxylic acid.

The new and novel compounds of the present invention
may be prepared by the process which is illustrated by the
following reaction sequence:

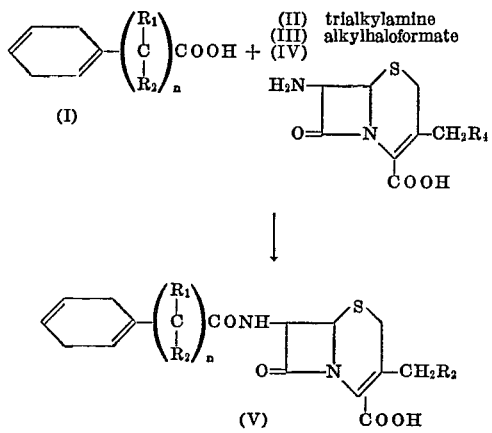

wherein $R_1$, $R_2$, and $n$ are defined as above and $R_4$ is hy-
drogen, hydroxy or (lower)alkanoyloxy. The above reac-
tion is effected by contacting a (1,4-cyclohexadienyl)
alkanoic acid (I) in a reaction-inert organic solvent e.g.
acetone, chloroform or dioxane with about an equimolar
amount of trialkylamine (II) e.g. trimethylamine at about
room temperature for a period of about one-half to about
two hours. Thereafter, the resulting mixture is cooled to
about 0° C., admixed with an alkylhaloformate, (III) e.g.
ethylchloroformate, cooled to —50° C. in a Dry-Ice ace-
tone bath and admixed with a chilled aqueous alkali metal
bicarbonate solution of a 7-amino-8-oxo-3-substituted-5-
thia-1-azabicyclo[4.2.0]oct-2-ene-2-carboxylic acid (IV)
at about 0° C. for about a half hour. The reaction mixture
is then allowed to equilibrate to about room temperature,
extracted with a water immiscible organic solvent e.g.
ether, acidified with a mineral acid e.g. hydrochloric acid,
extracted with methyl isobutyl ketone, and then evap-
orated to dryness to afford an appropriate 7-(1,4-cyclo-
hexadienylamido)-8-oxo-3-substituted-5-thia - 1 - azabi-
cyclo[4.2.0]oct-2-ene-2-carboxylic acid (V).

The above prepared compounds (V) can be recovered
from the reaction mixture in which it is formed as a salt,
suitably the potassium or sodium salt. The salts of these
novel compounds (V) usually crystallize well, e.g. the
alkali metal salts may be crystallized by concentrating
their aqueous solution.

The 7-(1,4-cyclohexadien-1-ylamido)-8-oxo-3-pyridyl-
methyl - 5 - thia - 1 - azabicyclo[4.2.0]oct-2-ene-2-carbox-
ylate betaines of the present invention, which are depicted
by Formula A wherein $R_3$ is N-pyridinium, are prepared
by contacting appropriate above-prepared 7-(1,4-cyclo-
hexadienylacylamido)cephalosporanic acids with pyridine,
in the presence of potassium, thiocyanate, as described
by Spencer et al. in J. Org. Chem. 32, page 500 (1967).

If desired, the free acid or a salt, for example, the
potassium salt, may be converted by metathetic reaction to another salt. Thus, by mixing an aqueous solution of the potassium salt of one of the new compounds (V) of this invention with an aqueous solution of the acetate of N,N'-dibenzylethylenediamine, there is obtained a crystalline precipitate of the dibenzylethylenediamine salt thereof. Other salts, if desired, may be prepared similarly. Thus, by mixing a concentrated aqueous solution of the potassium or sodium salt of one of these new compounds (V) with an aqueous solution of dibenzylamine acetate, there is obtained a precipitate of the corresponding dibenzylamine penicillin.

The (1,4-cyclohexadien-1-yl)alkanoic acid (I) starting materials employed in the above reaction are prepared by the procedure described in copending U.S. patent application, Ser. No. 843,802, by Harvey E. Alburn and William Dvonch, entitled "(1,4 - Cyclohexadien-1-Yl) Alkanoic Acids," identified by Attorney Docket No. AHP–5095, filed in the U.S. Patent Office on the same day as the subject application. Therein the (1,4-cyclohexadien-1-yl)alkanoic acids are prepared by subjecting their corresponding phenylalkanoic acids to a Birch reduction. The 7-amino-8-oxo-3-substituted-5-thia-1-azabicyclo[4.2.0]oct-2-ene-2-carboxylic acid (IV) reactants may be prepared by the procedure described in copending U.S. patent application, Ser. No. 843,783, by Richard Bogash, Milton Wolf and John H. Sellstedt, entitled "2-Amido-6-Amino-Penicillanic Acids, 2-Amido-7-Amino Cephalosporanic Acids and Related Compounds," identified by Attorney Docket No. AHP–4878, also filed on the same day as the subject application. Therein these reactants (IV) are prepared by reacting a known starting material e.g. cephalothin with a saccharin halide, in methylene chloride, in the presence of triethylamine to afford 2-saccharimidocephalothin which is then reacted with phosphorus pentachloride, in methylene chloride, in the presence of quinoline, to yield the corresponding saccharimido of 7-chloroimidocephalothin which is contacted with an alkanol to afford the saccharimido of 7-alkoxyimidocephalothin, hydrochloride which is hydrolyzed to produce the saccharimido of 7-aminocephalosporanic acid, hydrochloride which is then neutralized and hydrolyzed in the presence of a hydrolytic catalyst, to afford 7-aminocephalosporanic acid. The process is more specifically illustrated in hereinafter Example VII.

The new and novel compounds (A) of the present invention possess valuable antibiotic activity. In particular, in standard and accepted biological tests these compounds have exhibited activity against staphylococci e.g. S. aureus CHP which are resistant to ordinary penicillins e.g. benzyl penicillin. In this regard, these compounds are, therefore, of value as antibacterial agents in the treatment of infectious diseases caused by penicillin resistant staphylococci.

The compounds inhibit S. aureus CHP when applied in an aqueous vehicle at a concentration of 1.95 µg./ml.

EXAMPLE I

Ethylchloroformate (1.47 ml., 0.015 mole) is added to an ice-cold solution of 2-(1,4-cyclohexadien-1-yl)acetic acid (2.08 g., 0.015 mole) and triethylamine (2.60 ml., 0.018 mole) in acetone (120 ml.). The solution is stirred at 0° C. for ten minutes and cooled to −50° C. with Dry-Ice-acetone. The suspension is rapidly stirred while an ice-cold solution of 7-aminocephalosporanic acid (4.89 g., 0.018 mole) in 3% sodium bicarbonate solution (126 ml.) is added. The resulting solution is stirred at 0° C. for a half hour, then at 25° C. for another hour, and then extracted with ether (3× 120 ml.). The pH of the aqueous phase is lowered from 8.1 to 2.0 with 6 N hydrochloric acid, and the solution extracted with methyl isobutyl ketone (3× 120 ml.). The organic phase was dried over sodium sulfate and concentrated in vacuo. The resulting oil stored at 5° C. until it crystallizes to afford 7 - [2-(1,4-cyclohexadien-1-yl)acetamido]cephalosporanic acid, also known as 7-[2-(1,4-cyclohexadien-1-yl)acetamido] - 3 - (hydroxymethyl)-8-oxo-5-thia-1-azabicyclo[4.2.0]oct-2-ene-2-carboxylic acid acetate, M.P. 153–5° C.

In the same manner, substituting 3-(1,4-cyclohexadien-1-yl)propionic acid for 2-(1,4-cyclohexadien-1-yl)acetic acid, the product obtained is 7-[2-(1,4-cyclohexadien-1-yl)propionamido]cephalosporanic acid, also known as 7-[2-(1,4-cyclohexadien - 1 - yl)propionamido] - 3 - (hydroxymethyl)-8-oxo - 5 - thia - 1 - azabicyclo[4.2.0]oct-2-ene-2-carboxylic acid acetate.

EXAMPLE II

Ethylchloroformate (0.030 mole) is added to an ice-cold solution of 2-(1,4-cyclohexadien-1-yl)butyric acid (0.015 mole) and triethylamine (0.036 mole) in acetone (240 ml.). The solution is stirred at 0° C. for ten minutes and cooled to −50° C. with Dry Ice-acetone. The suspension is rapidly stirred while an ice-cold solution of 7-aminocephalosporanic acid (0.036 mole) in 3% sodium bicarbonate solution (252 ml.) is added. The resulting solution is stirred at 0° C. for a half hour, then at 25° C. for another hour, and then extracted with ether (3× 240 ml.). The pH of the aqueous phase is lowered from 8.1 to 2.0 with 6 N hydrochloric acid, and the solution was extracted with methyl isobutyl ketone (3× 240 ml.). The organic phase was dried over sodium sulfate and concentrated in vacuo to afford 7-[3-(1,4-cyclohexadien-1-yl)butyramido]cephalosporanic acid, also known as 7-[3-(1,4-cyclohexadien-1-yl)butyramido]-3-(hydroxymethyl)-8-oxo-5-thia - 1 - azabicyclo[4.2.0]oct-2-ene-2-carboxylic acid acetate.

In a similar manner, 7-aminocephalopsoranic acid is reacted with 2-(1,4-cyclohexadien-1-yl)caproic acid to yield 7-[2-(1,4 - cyclohexadien-1-yl)caproamido]cephalosporanic acid, also known as 7-[2-(1,4-cyclohexadien-1-yl)caproamido] - 3 - (hydroxymethyl) - 8 - oxo-5-thia-1-azabicyclo[4.2.0]oct-2-ene-2-carboxylic acid acetate.

EXAMPLE III

When the procedure of Examples I–II is repeated to react an appropriate (1,4-cyclohexadien - 1 - yl)alkanolic acid reactant with 7-aminocephalosporanic acid, the following products are obtained:

| Reactants | Products |
| --- | --- |
| 2-(1,4-cyclohexadien-1-yl)-2-methylpropionic acid. | 7-[2-(1,4-cyclohexadien-1-yl)-2-methyl-[propionamido]cephalosporanic acid. |
| 4-(1,4-cyclohexadien-1-yl)-butyric acid. | 7-[4-(1,4-cyclohexadien-1-yl)-butyramido]cephalosporanic acid. |
| 5-(1,4-cyclohexadien-1-yl)-acetic acid. | 7-[5-(1,4-cyclohexadien-1-yl)-acetamido]cephalosporanic acid. |
| 5-(1,4-cyclohexadien-1-yl)-valeric acid. | 7-[5-(1,4-cyclohexadien-1-yl)-valeramido]cephalosporanic acid. |
| 6-(1,4-cyclohexadien-1-yl)-caproic acid. | 7-[6-(1,4-cyclohexadien-1-yl)-caproamido]cephalosporanic acid. |
| 2-(1,4-cyclohexadien-1-yl)-valeric acid. | 7-[2-(1,4-cyclohexadien-1-yl)-valeramido]cephalosporanic acid. |
| 2-ethyl-2-(1,4-cyclohexadien-1-yl)butyric acid. | 7-[2-ethyl-2-(1,4-cyclohexadien-1-yl)butyramido]cephalosporanic acid. |
| 2-butyl-3-(1,4-cyclohexadien-1-yl)caproic acid. | 7-[2-butyl-3-(1,4-cyclohexadien-1-yl)caproamido]cephalosporanic acid. |
| 5-(1,4-cyclohexadien-1-yl)-3,4-dimethylvaleric acid. | 7-[5-(1,4-cyclohexadien-1-yl)-3,4-dimethylvaleramido]cephalosporanic acid. |

EXAMPLE IV

Ethylchloroformate (0.015 mole) is added to an ice-cold solution of 2-(1,4-cyclohexadien-1-yl)acetic acid (0.015 mole) and trimethylamine (0.018 mole) in acetone (120 ml.). The solution is stirred at 0° C. for ten minutes and cooled to −50° C. with Dry-Ice-acetone. The suspension is rapidly stirred while an ice-cold solution of 7-amino-3-(hydroxymethyl)-8-oxo-5-thia-1-azabicyclo [4.2.0]oct-2-ene-2-carboxylic acid (0.018 mole) in 3% sodium bicarbonate solution (126 ml.) is added. The resulting solution was stirred at 0° C. for a half hour, and at 25° C. for another hour, and then extracted with ether (3×120 ml.). The pH of the aqueous phase is lowered from 8.1 to 2.0 with 6 N hydrochloric acid, and the solution extracted with methyl isobutyl ketone (3×120 ml.). The organic phase is dried over sodium sulfate and concentrated in vacuo to afford 7-[2-(1,4-cyclohexadien-1 - yl)acetamido]-3-(hydroxymethyl)-8-oxo-5-thia-1-azabicyclo[4.2.0]oct-2-ene-2-carboxylic acid.

EXAMPLE V

When the procedure of Example IV is repeated to react an appropriate 7-amino-8-oxo-3-substituted-5-thia-1-azabicyclo[4.2.0]oct-2-ene-2-carboxylic acid with (1,4-cyclohexadien-1-yl)alkanoic acids, compounds having the following structural formula are produced:

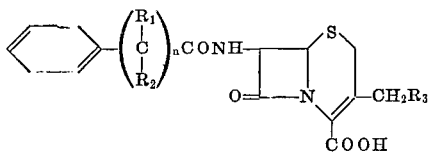

wherein $R_1$, $R_2$, $R_3$ and $n$ are defined as follows:

| $R_1$ | $R_2$ | $R_3$ | $n$ |
|---|---|---|---|
| Hydrogen | Hydrogen | Hydrogen | 1 |
| Methyl | Methyl | do | 2 |
| Ethyl | Hydrogen | Acetoxy | 1 |
| Methyl | Ethyl | Butyroxy | 1 |
| Hydrogen | Hydrogen | Propionoxy | 2 |

EXAMPLE VI

A mixture of 7-[2-(1,4-cyclohexadien-1-yl)acetamido]-3 - (hydroxymethyl)-8-oxo-5-thia-1-azabicyclo[4.2.0]oct-2-ene-2-carboxylic acid acetate (0.012 mole) as prepared in Example I, potassium thiocyanate (0.028 mole), pyridine (0.021 mole) in 15 ml. of water is adjusted to pH 6.5 with 85% phosphoric acid and heated with stirring at 60° C. for six hours. After cooling to room temperature, the reaction mixture is extracted with a high molecular weight, water-insoluble, liquid secondary amine resin in the acetate form in methyl isobutyl ketone. The aqueous portion is allowed to stand overnight in the cold (5° C.), then filtered and the collected solid dried to afford 7-[2-(1,4 - cyclohexadien - 1 - yl)acetamido]-8-oxo-3-pyridylmethyl - 5 - thia-1-azabicyclo[4.2.0]oct-2-ene-2-carboxylate betaine.

Similarly, 7 - [3-(1,4-cyclohexadien-1-yl)butyramido]-8 - oxo - 3-pyridylmethyl-5-thia-1-azabicyclo[4.2.0]oct-2-ene-2-carboxylate betaine is synthesized.

EXAMPLE VII

Triethylammonium 3 - acetoxymethyl - 8-oxo-5-thia-7-thiophene-2-acetamido)-azabicyclo[4.2.0]oct-2-ene-2-carboxylate (0.040 mole), cephalothin, is added to anhydrous methylene chloride (150 ml.) contained in a dry 500 ml. three neck round bottom flask equipped with a stirrer, a drying tube and a thermometer. Thereafter, the solution is cooled to 5° C. in ice and pseudosaccharin chloride (0.040 mole) is added all at once, giving a yellow solution. The solution is stirred for one-half hour at 5° C., and kept at room temperature overnight. The solution is then brought to the boiling point for five minutes, and allowed to cool to room temperature to afford 2-[3-hydroxymethyl - 8 - oxo-7-(2-thiophenacetamido)-5-thia-1-azabicyclo[4.2.0]oct - 2 - ene-2-ylcarbonyl]-1,2-benzisothiazol-3(2H)-one 1,1-dioxide, acetate also designated as the saccharimide of cephalothin, M.P. 160° C. dec. (uncorr.).

Thereafter, quinoline (0.110 mole) is added to the stirred solution containing said saccharimide. The mixture is cooled to —30° C. and phosphorus pentachloride (11.6 g., 0.056 mole) is added over a few minutes, keeping the temperature at —30° C. The mixture is stirred for three hours at —30° C. to yield 2-[7-(1-chloro-2-[2-thienyl] ethylideneamino) - 3 - hydroxymethyl-8-oxo-5-thia-1-azabicyclo[4.2.0]oct - 2-ene-2-ylcarbonyl]-1,2-benzisothiazol-3(2H)-one 1,1-dioxide, acetate, also known as the saccharimide of 7-chloroimidocephalothin.

To the above-described mixture containing said 7-chloroimide, quinoline (0.055 mole) is added followed by absolute ethanol (100 ml.) over a few minutes, keeping the temperature at —30° C., the temperature is rapidly raised to +20° C. with hot water, and immediately brought back to —30° C. and stirred for another hour. Then the temperature is brought up to +20° C. with hot water and immediately back to —10° C. and stirred for one more hour to afford 2-[u-(1-ethoxy-2-[2-thienyl] ethylideneamino) - 3 - hydroxymethyl-8-oxo-5-thia-1-azabicyclo[4.2.0]oct- 2-ene-2-ylcarbonyl]-1,2-benzisothiazol-3(2H)-one, 1,1-dioxide, acetate, hydrochloride also described as the saccharimide of 7-ethoxyimidocephalothin, hydrochloride.

Subsequently, water (75 ml.) is added to above-described mixture containing said 7-ethoxyimide hydrochloride and the temperature is lowered to 0° C. overnight and filtered. The solid is washed with cold (5° C.) water (30 ml.), without slurrying the solid in the water, and sucked dry. The solid is then washed with cold (5° C.) methylene chloride (2× 30 ml.), slurried in absolute ether and dried on the funnel, dried over $P_2O_5$ in a vacuum, giving crystals of 2-[7-amino - 3 - hydroxymethyl-8-oxo - 5 - thia - 1 - azabicyclo[4.2.0]oct - 2 - ene-2-ylcarbonyl] - 1,2 - benzisothiazol - 3(2H) - one 1,1-dioxide, acetate, hydrochloride, also known as the saccharimide of 7-aminocephalosporanic acid, hydrochloride.

2-[7-amino - 3 - hydroxymethyl - 8 - oxo - 5 - thia-1-azabicyclo[4.2.0]oct - 2 - ene - 2 - ylcarbonyl] - 1,2-benzisothiazol - 3(2H) - one 1,1 - dioxide, acetate, hydrochloride (0.02 mole), as prepared above, is powdered and added to water (75 ml.) in four portions, stirred at 0° C. Adjustment of the pH to 6.9 after each addition is done with a 60° C. saturated sodium bicarbonate solution. After the second addition some ether is added to control the foaming. After the final adjustment of the pH to 6.9 the mixture is stirred at 0–2° C. for ten minutes, and the pH slowly goes to 7.1. The solid is filtered and washed with cold water (2×), and dried in a desiccator over $P_2O_5$ under vacuum at 5° C., giving a white solid which is 2-[7 - amino - 3 - hydroxymethyl-8-oxo - 5 - thia - 1 - azabicyclo[4.2.0]oct - 2 - ene - 2-ylcarbonyl] - 1,2 - benzisothiazol - 3(2H) - one 1,1-dioxide, acetate, also described as the saccharimido of 7-aminocephalosporanic acid.

2 - [7 - amino - 3 - hydroxymethyl - 8 - oxo - 5 - thia-1 - azabicyclo[4.2.0]oct - 2 - ene - 2 - ylcarbonyl]1,2-benzisothiazol-3(2H)-one, 1,1-dioxide, acetate as above-prepared, is dissolved in tetrahydrofuran (60 ml.) and a solution of sodium bicarbonate (0.04 mole) in water (40 ml.) is added all at once. The mixture is stirred for three hours at room temperature giving a solution. Then the tetrahydrofuran is removed at 30° C. under vacuum, and the resulting mixture is washed with methylene chloride. The aqueous fraction is then placed on a rotary evaporator at 30° C. and the dissolved methylene chloride is removed. The solution is filtered and the pH adjusted to 3.8 with glacial acetic acid. The mixture is stirred in ice-water for one-half hour and then filtered, giving crystals of 7-amino - 3 - (hydroxymethyl)-8-oxo-5-thia - 1 - azabicyclo[4.2.0]oct - 2 - ene - 2 - carboxylic acid, acetate, also known as 7-aminocephalosporanic acid.

What is claimed is:
1. A compound selected from the group consisting of those having the formula:

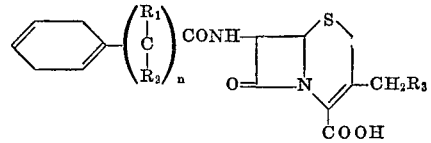

wherein $R_1$ and $R_2$ are both selected from the group consisting of hydrogen and lower alkyl; $R_3$ is selected from the group consisting of hydrogen, hydroxy, lower alkanoyloxy or N-pyridinium; $n$ is an integer from 1 to about 6; and the non-toxic biologically active salts thereof.

2. A compound as described in claim 1 which is: 7-[2 - (1,4 - cyclohexadien - 1 - yl)acetamido] - 3 - (hydroxymethyl) - 8 - oxo - 5 - thia - 1 - azabicyclo[4.2.0]oct-2-ene-2-carboxylic acid acetate.

3. A compound as described in claim 1 which is: 7-[2 - (1,4 - cyclohexadien - 1 - yl)propionamido]-3-(hydroxymethyl) - 8 - oxo - 5 - thia - 1 - azabicyclo[4.2.0]oct-2-ene-2-carboxylic acid acetate.

4. A compounds as described in claim 1 which is: 7-[3 - (1,4 - cyclohexadien - 1 - yl)butyramido[-3-(hydroxymethyl) - 8 - oxo - 5 - thia - 1 - azabicyclo[4.2.0]oct-2-ene-2-carboxylic acid acetate.

5. A compound as described in claim 1 which is: 7-[2 - (1,4 - cyclohexadien - 1 - yl)acetamido] - 3 - (hydroxymethyl) - 8 - oxo - 5 - thia - 1 - azabicyclo[4.2.0]oct-2-ene-2-carboxylic acid.

References Cited
UNITED STATES PATENTS

| | | | |
|---|---|---|---|
| 3,270,009 | 8/1966 | Flynn | 260—239.1 |
| 3,338,896 | 8/1967 | Takano et al. | 260—239.1 |

NICHOLAS S. RIZZO, Primary Examiner

U.S. Cl. X.R.

424—246